United States Patent [19]

Kyo et al.

[11] 4,187,358

[45] Feb. 5, 1980

[54] RESIN COMPOSITION

[75] Inventors: Kayomon Kyo, Kyoto; Yasuhiko Asai, Uji; Sadao Kato, Uji; Tadashi Ishikura, Uji; Hiroshi Sugawara, Uji, all of Japan

[73] Assignee: Unitika Ltd., Amagasaki, Japan

[21] Appl. No.: 974,210

[22] Filed: Dec. 28, 1978

[30] Foreign Application Priority Data

Dec. 29, 1977 [JP] Japan .................................. 52/160047

[51] Int. Cl.$^2$ .............................................. C08L 77/00
[52] U.S. Cl. .............................. 525/132; 260/45.75 C; 525/190; 525/919
[58] Field of Search ........................ 260/857 L, 857 PE

[56] References Cited

U.S. PATENT DOCUMENTS

| | | | |
|---|---|---|---|
| 3,845,163 | 10/1974 | Murch | 260/857 L |
| 4,052,481 | 10/1977 | Asahara | 260/857 PE |
| 4,078,014 | 5/1978 | Starkweather | 260/857 L |
| 4,123,420 | 10/1978 | Kyo et al. | 260/873 |

FOREIGN PATENT DOCUMENTS 2813479  5/1978  Fed. Rep. of Germany .... 260/857 PG

OTHER PUBLICATIONS

Chemical Abstracts: Kyo et al., Japan Kokai 78 51,244 vol. 89, No. 130,360R (1978).

*Primary Examiner*—Paul Lieberman
*Attorney, Agent, or Firm*—Sughrue, Rothwell, Mion, Zinn and Macpeak

[57] ABSTRACT

A resin composition comprising
(A) an aromatic copolyester derived from (i) a mixture of terephthalic acid and isophthalic acid and/or the functional derivatives thereof and (ii) a bisphenol and/or the functional derivatives thereof;
(B) a polyamide; and
(C) an ionomer.

Molded articles prepared from the resin composition exhibit superior thermal stability, mechanical properties and molding characteristics, especially superior impact characteristics and relatively thin molded articles are resistant to flexing.

20 Claims, 2 Drawing Figures

RESIN COMPOSITION

BACKGROUND OF THE INVENTION

1. Field of the Invention

This invention relates to a resin composition having improved dynamic properties. More specifically, it relates to a resin composition of improved dynamic properties comprising an aromatic copolyester, a polyamide and an ionomer.

2. Description of the Prior Art

Aromatic copolyesters prepared from terephthalic acid and isophthalic acid or its functional derivative and a bisphenol and its functional derivative are thermoplastic resins having thermal stability with a high heat distortion temperature and a high heat decomposition temperature which also have superior mechanical and electrical properties. They find wide applications in fields which require high performance as engineering plastics. They, however, have the defect that their moldability is inferior to general thermoplastic resins because of their high heat distortion temperature. For example, they require high molding temperatures and high injection pressures in injection molding, and have the defect that molded articles prepared therefrom tend to have sinks, flow marks, large internal stresses, etc.

Generally, sinks, flow marks, large internal stresses, etc. greatly influence not only the appearance of the molded articles but also their mechanical properties, and frequently, the superior properties inherent in the resin are not exhibited fully. Furthermore, because depending upon the type of the molded articles, a sufficient flow length in the molding cavity cannot be obtained, the molded article will sometimes not be perfect. In this sense, superior moldability as well as various superior performances have previously been considered as important factors in evaluating a certain resin as engineering plastics. It is known, on the other hand, that when it is desired to improve the moldability of thermally stable engineering plastics by blending other polymers, the heat distortion temperature tends to be lowered.

Aromatic copolyesters have the many advantages described above, but because they are not resistant to organic solvents, their uses are limited.

On the other hand, polyamides have very good organic solvent resistance, abrasion resistance and moldability, but insufficient thermal stability. For example, polyhexamethylene adipamide has a heat distortion temperature of 59° C. and polycaprolactam has a heat distortion temperature of 56° C. Another serious defect of the polyamides is that they have high moisture absorption and as a result their dimensions and dynamic properties change, and their electrical properties deteriorate, upon the absorption of moisture.

A resin composition composed of an aromatic copolyester and a polyamide has a markedly increased heat distortion temperature over the polyamide alone, and improved moldability and solvent resistance over the aromatic copolyester. The degree of improvement of these properties are far higher than those which would be expected from the mere addition of the two ingredients. That is the improved properties are unexpected from the properties of the individual ingredient of the composition. Such a resin composition is very useful because it retains the superior tensile strength, flexure recovery characteristics and dimensional stability possessed by the aromatic copolyester and the superior crack resistance and abrasion resistance possessed by the polyamide. In this regard, see Japanese patent application (OPI) Nos. 4146/75 and 98765/77 (The term "OPI" as used herein refers to a "published unexamined Japanese patent application".).

When a resin composition comprising an aromatic copolyester and a polyamide is molded into various molded articles by injection molding and their properties are examined in detail, the following defects are found. Specifically, the thin parts, such as in the gate portion (See 2 in FIG. 1), and protruding slender rod-like portions of the molded articles are susceptible to breakage especially in an absolutely dried condition, and release of the molded articles from the mold is hampered, and the design of the product is restricted. Furthermore, it has been ascertained that even those molded articles which have a relatively large thickness are susceptible to cracking upon the application of an impact force such as falling impact or falling ball impact. These phenomena drastically restrict the utility of these resin compositions.

Furthermore, while the two-component resin composition has reduced moisture related changes in dimension or electrical properties as compared with the polyamide, it is frequently unsatisfactory for use as various machine parts or electric component parts which require a high dimensional accuracy. Hence, it is desired to improve the resin composition further.

In such applications as electric wires and cables or electrically insulating tubes, a composition composed of an aromatic copolyester and a polyamide is rated high because it has improved electrical properties based on a decrease in moisture absorption, increased thermal stability and superior cut-through property (i.e., it is difficult to cut through the tube when an acute-angled body is urged against it). On the other hand, it has been frequently desired to improve the flexibility, dimensional stability to water, electrical properties, elongation and impact properties of the resin composition. Furthermore, in the case of extruded pipes, tubes, monofilaments, sheets, and films, products having high levels of dynamic properties, flexibility, thermal stability and solvent resistance have been desired.

The ionomer is known (Japanese Pat. No. 6810/64). A composition composed of a polyamide and the ionomer is also known. This composition has superior dynamic properties to the polyamide alone, and has improved extrusion moldability and blow moldability, and improved resistance to water or organic solvents over that of the polyamide, but it has a lower heat distortion temperature in comparison to the polyamide alone (Japanese Pat. No. 12546/67).

A composition comprising an aromatic copolyester and an ionomer is also known (Japanese patent application (OPI) No. 51244/78). This resin composition has a longer flow length in the molding cavity during injection molding than the aromatic copolyester alone, but when caused to reside within a molding machine, tends to decompose. Thus, the properties of the resin composition are not fully exhibited in the resulting molded articles.

SUMMARY OF THE INVENTION

A first object of the present invention is to provide a method for improving the dynamic properties of a resin composition comprising an aromatic copolyester and a polyamide.

A second object of this invention is to provide a method for improving the impact properties and the brittleness of a thin portion of a molded article.

These and other objects of the present invention will be more apparent in the following detailed description of the invention.

DETAILED DESCRIPTION OF THE INVENTION

Figure 1:
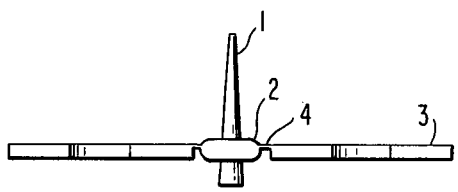
FIG. 1 is a front view of a test piece testing the bend strength of a gate.

Extensive investigations have been made in an attempt to obtain a resin composition having the aforesaid properties, and it has been found that a resin composition comprising an aromatic copolyester, a polyamide and an ionomer has such properties. This discovery has led to the present invention wherein there is provided a resin composition comprising:

(A) About 5 to about 94.9% by weight of an aromatic copolyester (hereinafter referred to as "PPES") comprising the reaction product of about equimolar amounts of (1) terephthalic acid and isophthalic acid and/or the functional derivatives thereof (the terephthalic acid-/isophthalic acid molar ratio being about 9:1 to about 1:9) and (2) a bisphenol of the following general formula [I]:

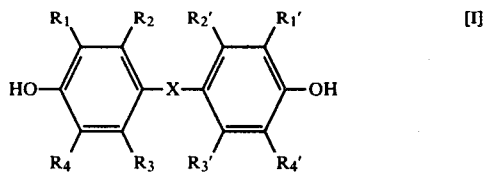

wherein —X— represents a member selected from the group consisting of —O—, —S—, —SO$_2$—, —SO—, —CO—, an alkylene group containing 1 to 5 carbon atoms, and an alkylidene group containing 1 to 5 carbon atoms, and $R_1$, $R_2$, $R_3$, $R_4$, $R_1'$, $R_2'$, $R_3'$ and $R_4'$, which may be the same or different, each is selected from the group consisting of a hydrogen atom, a chlorine atom, a bromine atom and an alkyl group containing 1 to 5 carbon atoms, and/or a derivative thereof.

(B) About 5 to about 94.9% by weight of a polyamide (hereinafter referred to as "PA") containing therein a repeating unit of the following general formula [II];

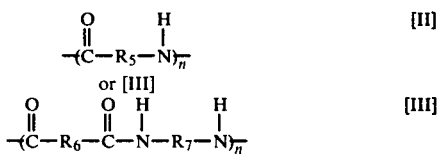

wherein $R_5$, $R_6$ and $R_7$, which may be the same or different, each represents an alkylene group containing 4 to 11 carbon atoms and n is an integer of from 30 to 500, and (C) About 0.1 to about 90% by weight of an ionomer.

The PPES used in this invention is obtained from a mixture of terephthalic acid and isophthalic acid and/or the functional derivatives thereof (the terephthalic acid unit/isophthalic acid unit molar ratio being about 9:1 to about 1:9) and a bisphenol of the following general formula [I]:

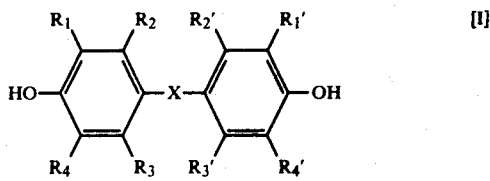

wherein —X— is selected from the group consisting of —O—, —S—, —SO$_2$—, —SO—, —CO—, an alkylene group containing 1 to 5 carbon atoms and an alkylidene group containing 1 to 5 carbon atoms, and $R_1$, $R_2$, $R_3$, $R_4$, $R_1'$, $R_2'$, $R_3'$ and $R_4'$, which may be the same or different, each is selected from the group consisting of a hydrogen atom, a chlorine atom, a bromine atom and an alkyl group containing 1 to 5 carbon atoms, and/or a functional derivative thereof.

Suitable examples of alkylene groups for X containing 1 to 5 carbon atoms include a methylene group, an ethylene group, a propylene group, a tetramethylene group and a pentamethylene group. Suitable examples of alkylidene groups for X containing 1 to 5 carbon atoms include an ethylidene group, a propylidene group, an isopropylidene group, an isobutylidene group and a pentylidene group.

Suitable examples of alkyl groups for $R_1$ and $R_4$ and $R_1'$ to $R_4'$ containing 1 to 5 carbon atoms include a methyl group, an ethyl group, an isopropyl group, a tert-butyl group and a neopentyl group.

A mixture of about 90 to about 10 mole% of terephthalic acid and/or the functional derivatives thereof and about 10 to about 90 mole% of isophthalic acid and/or the functional derivatives thereof is used as an acid component to be reacted with the bisphenol to prepare the PPES used in this invention. Preferably, a mixture of 30 to 70 mole% of terephthalic acid and/or the functional derivatives thereof and 70 to 30 mole% of isophthalic acid and/or the functional derivatives thereof is used. PPES prepared from a bisphenol having the general formula [I] (hereinafter "bisphenol") and a mixture of 50 mole% of terephthalic acid and/or the functional derivatives thereof and 50 mole% of isophthalic acid and/or the functional derivatives thereof is most preferred. The molar ratio of the bisphenol to the sum of the terephthalic acid units and isophthalic acid units is substantially equimolar, e.g., about 1:0.95 to 1.2, preferably about 1:1, most preferably 1:1.

Examples of functional derivatives of terephthalic or isophthalic acid which can be used in this invention include acid halides, dialkyl esters and diaryl esters. Preferred examples of acid halides include terephthaloyl dichloride, isophthaloyl dichloride, terephthaloyl dibromide and isophthaloyl dibromide. Preferred examples of dialkyl esters include dialkyl esters of those alcohols containing 1 to 6 (especially 1 to 2) carbon atoms in each alkyl moiety thereof. Preferred examples of diaryl esters include diphenyl terephthalate and diphenyl isophthalate.

Examples of suitable bisphenols which can be used are 4,4'-dihydroxy-diphenyl ether, bis(4-hydroxy-2-methylphenyl)ether, bis(4-hydroxy-3-chlorophenyl)ether, bis(4-hydroxyphenyl)sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenyl)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and 1,1-bis(4-hydroxyphenyl)-n-butane. 2,2-bis(4-hydroxyphenyl)propane, bisphenol A, is most typical, is easily available, and, accordingly, is most often used.

Typical examples of the functional derivatives of the bisphenol which can be used are the alkali metal salts and diesters thereof with aliphatic monocarboxylic acid containing 1 to 3 carbon atoms. Suitable examples of aliphatic monocarboxylic acids include formic acid, acetic acid, propionic acid, etc. Preferred functional derivatives of the bisphenols are the sodium salts, the potassium salts, and the diacetate esters thereof. The bisphenol can be used either individually or as a mixture of two or more thereof.

In the preparation of the aromatic copolyester from terephthalic acid or isophthalic acid or the functional derivatives thereof and the bisphenol, at most 30 mole%, preferably at most 10 mole%, of a compound having a carbonate linkage such as diphenyl carbonate or an aliphatic glycol such as ethylene glycol, propylene glycol, tetramethylene glycol or neopentyl glycol may also be copolymerized therewith to improve the molding characteristics.

To produce the aromatic copolyester used in this invention, the interfacial polymerization method which comprises mixing a solution of an aromatic dicarboxylic acid chloride in a water-immiscible organic solvent with an alkaline aqueous solution of bisphenol, the solution polymerization method which comprises heating bisphenol and an acid chloride in an organic solvent, and the melt polymerization method which comprises heating a phenyl ester of an aromatic dicarboxylic acid and bisphenol, which are described in detail in U.S. Pat. Nos. 3,884,990, 3,946,091, and 4,052,481 can, for example, be employed.

In order to insure good physical properties for the aromatic copolyesters used in this invention, they should have a logarithmic viscosity number ($\eta_{inh}$), defined by the following equation, of about 0.3 to about 1.5, preferably 0.4 to 0.8.

$$\eta_{inh} = \frac{\log_e t_1/t_2}{C}$$

wherein $t_1$ is the falling time (in seconds) of a solution of the aromatic copolyester; $t_2$ is the falling time (in seconds) of the solvent; and C is the concentration (g/dl) of the aromatic copolyester in the solution. The logarithmic viscosity number used herein, is determined in a 1,1,2,2-tetrachloroethane-phenol mixture (weight ratio: 4:6) at 25° C.

The PA component of the resin composition of this invention is a compound having therein a repeating unit represented by the following general formula [II]:

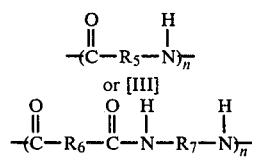

or [III]

wherein $R_5$, $R_6$ and $R_7$, which may be the same or different, each represents an alkylene group having 4 to 11 carbon atoms, and n is an integer of 30 to 500. Some of the alkylene groups, e.g., $R_5$, $R_6$ and $R_7$, may be replaced by aromatic groups, e.g.,

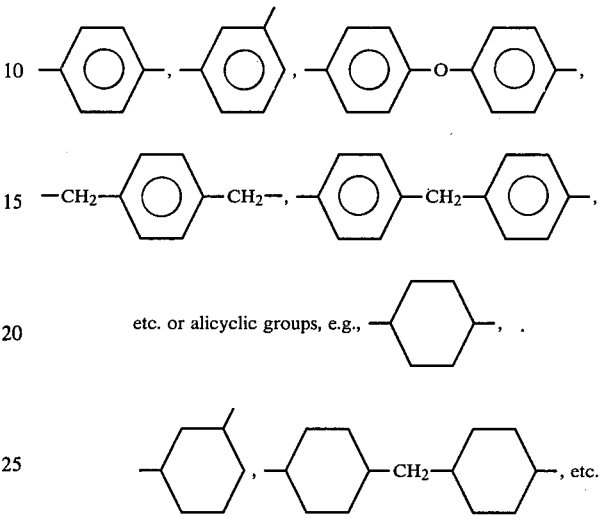

Suitable examples of alkylene groups containing 4 to 11 carbon atoms for $R_5$ to $R_7$ include a tetramethylene group, a pentamethylene group, a hexamethylene group, a heptamethylene group, an octamethylene group, a nonamethylene group, a decamethylene group, and an undecamethylene group. Commercial sources of PA are readily available including ZYTEL (du Pont, polyhexamethylene adipamide, polyhexamethylene sebacamide), and UNITIKA NYLON (Unitika Ltd. polycaprolactam), etc.

Any PA which contains a repeating unit represented by either of the above general formulae [II] and [III] can be used in this invention and there is no further limitation. Preferred examples of the PA include polyhexamethylene adipamide, polycaprolactam, polyhexamethylene sebacamide, polyaminoundecanoic acid, and polylaurolactam.

Copolyamides can also be used as the PA in this invention. Examples of suitable copolyamides include a copolyamide derived from caprolactam and hexamethylene adipamide, and a copolyamide derived from caprolactam and hexamethylene sebacamide.

The ionomer used in this invention is a base copolymer as described below and a product obtained by reacting the base copolymer with a metal compound capable of ionizing the copolymer. Such method for producing the ionomer is described in Japanese Pat. No. 6810/64. It is produced by reacting a base copolymer with a metal compound capable of ionizing the copolymer. The base copolymer is composed of an alpha-olefin of the general formula $RCH=CH_2$ wherein R represents a hydrogen atom, a formyloxy group, an acetoxy group, a benzoyloxy group, a hydroxy group, a halogen atom, an alkyl group containing 1 to 8 carbon atoms, an aryl group containing 6 to 12 carbon atoms or an alicyclic group containing 6 to 12 carbon atoms; and an alpha-beta-unsaturated carboxylic acid containing 1 or 2 carboxyl groups and 3 to 10 carbon atoms. The molar ratio for the amount of α-olefin to the amount of the carboxylic acid is about 99.9 to 50 mol α-olefin to about 0.1 to 50 mol carboxylic acid, preferably about 99 to 90 mol α-olefin to about 1 to 10 mol carboxylic acid. α-Olefin/monocarboxylic acid copolymers such as ethylene/acrylic acid copolymer and ethylene/methacrylic acid copolymer are especially suitable. Examples of base copolymers that can be conveniently used include an ethylene/acrylic acid copolymer, an ethylene/methacrylic acid copolymer, an ethylene/itaconic acid copolymer, an ethylene/maleic acid copolymer, an ethylene/acrylic acid/methyl methacrylate copolymer, an ethylene/methacrylic acid/vinyl acetate copolymer, an ethylene/acrylic acid/vinyl alcohol copolymer, an ethylene/propylene acrylic acid copolymer, an ethylene/styrene/acrylic acid copolymer, an ethylene/methacrylic acid/acrylonitrile copolymer, an ethylene/vinyl chloride/acrylic acid copolymer, an ethylene/chlorotrifluoroethylene/methacrylic acid copolymer, a polyethylene/acrylic acid graft copolymer, and a polypropylene/acrylic acid graft copolymer. Examples of the base copolymers as described above are disclosed in Japanese Pat. No. 12546/67.

As the metallic ion, the metal ions of the groups IA, IB, IIA, IIB and IIIA in the periodic table are preferable. When the base copolymer is an alpha-olefin/monocarboxylic acid copolymer, the metallic ions having an aromatic valence of 1 to 3 (for example, $Na^+$, $K^+$, $Li^+$, $Cu^{2+}$, $Be^{2+}$, $Mg^{2+}$, $Zn^{2+}$, and $Al^{3+}$) are suitable.

The ionomer can be produced by reacting the base copolymer with a formate, acetate, hydroxide, methoxide, carbonate, etc. of the above metals. In the present invention, the use of divalent or higher metals, especially $Cu^{2+}$ or $Zn^{2+}$, can give better dynamic properties than the use of monovalent metallic ions. Furthermore, the most effective metal among these metals is $Zn^{2+}$ in the point of the dynamic property. When $Zn^{2+}$ is used as metallic ion, the molding which is not colored can be obtained. Ionomers containing two or more metallic ions can also be used.

In the present invention, acidic olefinic copolymers which are not reacted with a metallic ion can also be used. The resin composition of the present invention can be obtained by mixing such acidic olefinic copolymers with PA and PPES without adding the metallic ion and also for example, it is possible to form a resin composition by adding the metallic ion while melt-extruding an acidic olefinic copolymer, a polyamide and/or PPES, thus neutralizing the acidic olefinic copolymer.

A resin composition composed of 5 to 95 parts by weight of PPES and 95 to 5 parts by weight of a polyamide has good moldability, thermal stability and solvent resistance. A resin composition composed of 25 to 75 parts by weight of PPES and 75 to 25 parts by weight of PA has a good balance of moldability, thermal stability and solvent resistance, and can be effectively used in injection molding, extrusion molding or the like. However, these resin compositions have many problems in practical applications as described hereinabove. Resin compositions obtained by adding about 0.1 to about 90% by weight of ionomer to each of the above resin compositions have now been found to have properties far better than those which can be anticipated from the mere addition of the properties of the constituent resins. It has been specifically found that when the ionomer is added to the resin composition in an amount of 0.1 to 25% by weight, especially 2 to 25% by weight, it improves the impact properties of the resin composition or the brittleness of a thin portion of the molded article with little or no fall in the heat distortion temperature of the resin composition composed of PPES and PA in spite of the fact that the ionomer is a very soft substance with a heat distortion temperature, measured by ASTM D-648 (18.6 kg/cm$^2$), of below room temperature. Furthermore, the water absorption of the resin composition in water is reduced, and its dimensional change at this time is far smaller than that which would be anticipated from the decrease in water absorption.

The dynamic properties such as Young's modulus or flexure modulus or strength of a resin composition composed of PPES and PA change greatly with the drying time and water absorption, and this change restricts the design of various molded articles which may be prepared from it. However, a great improvement has been achieved in this regard in accordance with this invention. It is surprising that in spite of the low solvent resistance of the ionomer; the resin composition obtained has almost the same superior organic solvent resistance as the composition of PPES and PA. Even when the content of the ionomer in the resin composition is about 25 to 50% by weight, the heat distortion temperature of the resin composition is equal to, or higher than, that of PA. In addition, this resin composition has greater flexibility, better impact properties and is less subject to changes in its properties by the influence of moisture than the composition containing the ionomer in an amount of about 0.5 to 25% by weight.

When the content of the ionomer is 50 to 90% by weight in the resin composition of this invention, the resin composition has very good flexibility. When this resin composition is compared with the ionomer alone or with a resin composition composed of the ionomer and PA having the same ionomer content as in the resin composition of this invention, the resin composition has far better thermal properties especially when its ionomer content is 25 to 80% by weight. The resin composition composed of PA and the ionomer alone has superior properties, but when it is compared with the resin composition of this invention at the same ionomer content, its thermal properties are inferior to the resin composition of this invention in all areas. Furthermore, the composition of PA and ionomer changes greatly in various properties (e.g., strength, elongation, modulus of elasticity, dimensional stability, electrical properties) by the effect of water. In addition, the resin composition of this invention has better cut-through property than the resin composed of PA and the ionomer.

In order that the resin composition of this invention may exhibit the aforesaid effects over the resin composition composed of PA and the ionomer, it should preferably contain at least about 5% by weight of PPES. The thermal properties of the resin composition are especially good when it contains at least 25 wt. % and up to 73 wt. % of PPES.

It has been found that when the PA component is omitted from the resin composition of this invention, the resin composition has very poor stability during molding, and is susceptible to decomposition, and also has very poor organic solvent resistance. Surprisingly, the addition of PA has been found to increase the stability of the molten mixture of PPES and ionomer. It is essential therefore that the resin composition of this invention should contain at least about 5% by weight of PA. When the content of PA is at least 25% and up to 73% by weight, the resulting resin has especially superior solvent resistance, stability during molding and thermal properties.

The resin composition of this invention has other beneficial properties. For example, the dynamic properties of the resin composition of this invention are less degraded even when a far greater amount of a filler is added than in the case of the resin composition composed of PPES and PA. This is a very important property. For example, various fillers are frequently used for a variety of purposes, for example, to impart fire retardancy, increase modulus elasticity, or to impart abrasion resistance. In this case, the dynamic properties of filled resin compositions are generally greatly degraded, and this has posed a problem in practical application. It is very favorable that the resin composition of this invention has an excellent property in this regard.

A resin composition in accordance with this invention in which the mixing ratio of PPES to PA is 25:75 to 75:25 (weight ratio) and the ionomer content is 2 to 25% by weight is very desirable because it has a good balance of thermal stability, impact strength and organic solvent resistance. Furthermore, a resin composition in accordance with this invention in which the weight ratio of PPES to PA is 25:75 to 75:25 and the ionomer content is more than 25% by weight but less than 50% by weight has superior flexibility, organic solvent resistance, impact strength, thermal stability, dimensional stability and electrical properties, and its impact strength is better than when the ionomer is used in lower amounts. Furthermore, a resin composition in accordance with this invention in which the weight ratio of PPES to PA is 25:75 to 75:25 and the ionomer content is more than 50% by weight but less than 80% by weight has very good flexibility, and a high level of impact characteristics and good thermal stability.

In preparing the resin composition of this invention, the three ingredients may be mixed using any of the known methods. For example, they may be mixed by kneading through a kneader or rollers. Or they may be melt-extruded through an extruder. Or they may be finely pulverized and mixed in a supermixer or a Henschel mixer, the mixture may then be pressformed or subjected to rotational molding. An especially suitable method of mixing is to knead the individual ingredients by a high-kneading type melt extruder at about 180° to about 320° C., preferably 210° to 280° C. for about 5 seconds to about 30 minutes so that they will be dispersed as uniformly as possible. The composition of this invention may contain reaction products formed through these steps.

In producing the resin composition of this invention, the sequence in which the materials are mixed is optional. Thus, the three ingredients may be mixed at the same time; or two of them mixed first, and then the remaining ingredient added; or a desired proportions of the three ingredients may be mixed first, and then the remaining proportion of three ingredients mixed.

In some cases, however, the sequence of mixing the three ingredients may greatly affect the properties of the product finally obtained. Preferably, therefore, the resin composition of this invention is prepared by a method which comprises melt-mixing PPES and PA first to form a resin composition, and mixing the composition with an ionomer in the molten state, or a method which comprises melt-mixing the ionomer and PA to form a resin composition, and then mixing the composition with PPES in the molten state. Such a method can give better thermal stability, dynamic properties and solvent resistance than the method which comprises melt-mixing the aromatic copolyester and the ionomer in advance.

In order to improve thermal stability, weatherability and oxidation resistance, the resin composition may further include heat decomposition inhibitors, ultraviolet light absorbers, antioxidants, etc. Heat stabilizers to be added for this purpose include metallic compounds, phosphorus compounds, and hindered phenols. When cuprous chloride (or cuprous iodide) and an amine compound (e.g., aromatic amines such as diaryl amine, diphenyl amine derivatives, reaction products of diaryl amine and a ketone and reaction products of diphenyl amine and an acetone) are added together to the resin composition in a Cu:amine weight ratio of about 1:0.1 to 1:10, the most improved thermal stability is obtained. Usually, the heat stabilizer is added in an amount of about 0.01 to about 5% by weight based on the weight of the resin composition.

Various weather resisting agents can be added to the resin composition of this invention to improve the weatherability thereof. Examples of suitable weather resisting agents include benzotriazole derivatives and benzophenone derivatives. Particularly preferred examples of these compounds are 2-(2'-hydroxy-5'-methylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, etc. Usually, the weather resisting agent is used in an amount of about 0.01 to about 5% by weight based on the weight of the resin composition.

If desired, fire retardants or fire retarding aids can be used together. Aromatic halogen compounds can be used as the fire retardants. Decabromodiphenyl ether is an especially preferred fire retardant, and $Sb_2O_3$ is also preferred as the fire retarding aid. The amount of the fire retardant or the fire retarding aid is about 0.5 to 50% by weight, preferably 0.1 to 30% by weight, based on the total weight of the resin composition.

If desired, ordinary reinforcing fillers, such as glass fibers, inorganic silicates, silica, quartz, silica gel, carbon fibers, cristobalite, asbestos, clay or talc, may also be incorporated in the resin composition of this invention. A suitable amount of these reinforcing fillers ranges from about 1 to about 50% by weight based on the weight of the resin composition.

Furthermore, in order to further improve the mechanical properties, such as impact strength or elongation at break, of the resin composition of this invention, it is possible to add a rubber such as acrylonitrile-butadiene rubber, polyester rubber or styrene-butadiene rubber, an acrylonitrile/butadiene/styrene (ABS) resin, a polycarbonate, polyethylene, polypropylene, polyurethane, polystyrene, EVA copolymers, poly(acrylates), polytetrafluoroethylene, polyalkylenephenylene esters, polyalkylenephenylene ester ethers, aromatic polyamides, polyvinyl alcohol, polyvinyl acetate, or poly(methyl methacrylate) to the resin composition. The suitable amount of these rubbers or polymer materials which can be used is about 1 to about 30% by weight, preferably about 1 to about 10% by weight, based on the weight of the resin composition.

The resin composition of this invention can be used in the form of powders, chips, etc., which can be molded into various useful molded articles by compression molding, injection molding, extrusion molding and the like using conventional molding processes. Examples of molded articles which can be produced include gears, bearings, electrical component parts, containers, films, sheets, monofilaments, and various other articles which are used widely in those fields where engineering plastics of high quality are required.

The following examples are given to illustrate this invention in greater detail. These examples should be considered, however, as merely exemplary and non-limiting. Unless otherwise indicated herein, all parts, percents, ratios and the like are by weight.

Figure 2:
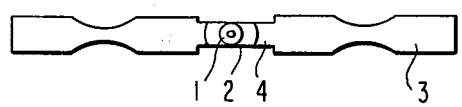
FIG. 2 is a plane view of the test piece.

The flexural strength of a thin molded article was evaluated by the following method described with reference to the accompanying drawings in which FIG. 1 is a front elevation of a test piece, and FIG. 2 is a top plane view thereof. In the drawings, the reference numeral 1 designates a sprue of an injection-molded article having a runner 2. Test piece 3 contains a gate 4. The runner is 8 mm in diameter. The gate is 8 mm in width and 1 mm in thickness. The shortest distance of the gate land (the lengthwise direction of the gate) is 2 mm. The test piece 3 is a ⅛ inch-thick tensile impact piece of the S size as set forth in ASTM D-1822. The test piece 3 is prepared under ASTM D-1822 prescribed molding conditions.

Immediately after the test piece is removed from the mold, the test piece is bent once in each of the upward and downward directions so that the test piece 3 and the runner 2 form a right angle with respect to the gate 4. When at this time, the gate is broken completely and the test piece separates at the runner portion, a rating of A is given. When it is partially broken at the gate but does not completely separate, a rating of B is given. When no breakage occurs, a rating of C is given. The ratio of test pieces given the rating of C to all of the test pieces examined is defined as the gate non-breaking ratio (%).

The test pieces were measured for water absorption by placing a 5×½×⅛ inch samples (described above) in water at 80° C. for 48 hours and measuring the change in the weight of the samples.

$$\text{Water absorption ratio (\%)} = \frac{Wt - Wo}{Wo} \times 100$$

where Wt is the weight of the test piece after testing and Wo is the dry weight before testing.

The dimensional stability of the test pieces in water was also measured. In this case the lengths of the pieces placed in water as described immediately above for the water absorption test were measured before and after testing with the dimensional change shown in the table being the percent change with respect to the original length.

Similar to the water based tests discussed above test samples were also placed in toluene at room temperature for 48 hours and the percent absorption and dimensional change were measured.

The U-Notch impact strength was conducted in accordance with ASTM D-256, but the notch radius was 1 mm.

EXAMPLES 1 TO 3
and
Comparative Examples 1 to 6

An aromatic copolyester was produced by interfacial polymerization technique from a methylene chloride solution of a 1:1 (mole ratio) mixture of terephthaloyl dichloride and isophthaloyl dichloride and an aqueous solution containing bisphenol A and sodium hydroxide. The copolyester had a logarithmic viscosity, as measured at 25° C. in phenol/tetrachloroethane (6:4 by weight), of 0.70.

The resulting aromatic copolyester and Nylon 6 (having a relative viscosity of 2.6, measured at 25° C. in 96% sulfuric acid at a polymer concentration of 1%) were mixed in the ratios indicated in Table 1 by a V-type blender, and then dried at 100° C. The mixture was then extruded at 280° C. by a high-kneading type extruder to form chips for Comparative Examples 1 to 4. Then, 87.5 parts by weight of the chips were mixed with 12.5 parts by weight of pellets of an inomer [Surlyn 1650 (a product of Mitsui Polychemical Co., Ltd.), Zn ion type]. The mixture was dried in vacuo at 60° C., and again extruded at 260° C. using an extruder of the high kneading type. The resulting pellets were of uniform milk white color and formed Examples 1 to 3.

The pellets were molded by an injection molding machine at a cylinder temperature of 250° C. to prepare test pieces for measurement of tensile impact strength (the S type set forth in ASTM D-1822) and test pieces having a size of 5"×½"×⅛". The former were used in a tensile impact test and an Izod impact test. The latter were used in measuring heat distortion temperatures in accordance with ASTM D-648, flexure modulus in accordance with ASTM D-760, water absorptions, dimensional changes due to water absorption, and weight and dimensional changes in toluene. For comparison (Comparative Examples 4 to 6), similar test pieces were prepared from each of the individual materials used in these examples, and tested in the same way.

The results are shown in Table 2. In Table 2, "dry" means that measurement was made after absolutely drying the test piece, and "wet" means that measurement was made after dipping the test piece for 48 hours in hot water at 80° C. Furthermore, before the measurement of the heat distortion temperatures, the test pieces of Examples 1 to 3 and Comparative Examples 1 to 5 were annealed at 150° C. for 2 hours.

Table 1

| Example/ Comp.Ex. | Material 1 Polymer/mix | Material 1 Amount (parts) | Material 2 Polymer | Material 2 Amount (parts) |
|---|---|---|---|---|
| C.Ex. 1 | PPES | 60 | Nylon 6 | 40 |
| C.Ex. 2 | " | 50 | " | 50 |
| C.Ex. 3 | " | 40 | " | 60 |
| Ex. 1 | Chips of C.Ex. 1 | 87.5 | Surlyn 1650 | 12.5 |
| Ex. 2 | Chips of C.Ex. 2 | " | " | " |
| Ex. 3 | Chips of C.Ex. 3 | " | " | " |
| C.Ex. 4 | PPES | 100 | — | — |
| C.Ex. 5 | Nylon 6 | 100 | — | — |
| C.Ex. 6 | Surlyn 1650 | 100 | — | — |

Table 2

| Example (Ex.) or Comparative Example (C.Ex.) | Unit | Ex. 1 | Ex. 2 | Ex. 3 | C.Ex. 1 | C.Ex. 2 | C.Ex. 3 | C.Ex. 4 | C.Ex. 5 | C.Ex. 6 |
|---|---|---|---|---|---|---|---|---|---|---|
| Gate | | | | | | | | | | |

Table 2-continued

| Example (Ex.) or Comparative Example (C.Ex.) | Unit | Ex. 1 | Ex. 2 | Ex. 3 | C.Ex. 1 | C.Ex. 2 | C.Ex. 3 | C.Ex. 4 | C.Ex. 5 | C.Ex. 6 |
|---|---|---|---|---|---|---|---|---|---|---|
| non-breaking ratio | % | 100 | 100 | 100 | 0 | 0 | 0 | 100 | 100 | 100 |
| Tensile impact test (1) (dry) | kg . cm/cm$^2$ | 195 | 215 | 220 | 120 | 155 | 160 | 350 | 225 | 531 |
| U-notch Izod Impact test (2) (dry) | " | 35 | 46 | 45 | 10 | 12 | 12 | 31 | 11 | not broken |
| Flexural modulus (3) (dry) | kg/cm$^2$ | 16500 | 17000 | 17800 | 20400 | 22100 | 21500 | 19000 | 20500 | 980 |
| Flexural modulus (3) (wet) | " | 11500 | 8800 | 8200 | 9400 | 7800 | 6800 | 17500 | 4400 | 880 |
| Ratio of flexural modulus (dry) to flexural modulus (wet) | — | 1.44 | 1.93 | 2.17 | 2.17 | 2.83 | 3.16 | 1.08 | 4.66 | 1.11 |
| Water absorption | % | 2.4 | 3.7 | 4.3 | 3.1 | 4.4 | 5.2 | 0.6 | 8.2 | 0.3 |
| Dimensional change due to water absorption | % | 0.4 | 0.6 | 0.65 | 0.9 | 1.1 | 1.35 | 0.1 | 1.8 | 0.1 |
| Heat distortion temperature (4) (18.6 kg/cm$^2$) | °C. | 154 | 149 | 138 | 155 | 148 | 145 | 173 | 64 | — |
| Heat distortion temperature (4) (4.6 kg/cm$^2$) | °C. | 165 | 161 | 160 | 164 | 162 | 160 | 178 | 174 | 37 |
| Weight change in toluene | % | 2.1 | 0.4 | 0.3 | 1.3 | 0.21 | 0.18 | 51 | 0.10 | 25.2 |
| Dimensional change in toluene | % | 0.7 | 0.18 | 0.14 | 0.4 | 0.13 | 0.11 | 13 | 0.08 | 8.4 |

(1) ASTM D-1822;
(2) Radius of the notch tip 1 mm;
(3) ASTM D-790;
(4) ASTM D-648.

It can be seen from Table 2 that the strength of a thin portion of a molded article prepared from the resin composition of this invention, as expressed by the gate non-breaking ratio, is increased over Comparative Examples 1 to 3, and the impact strengths of the test pieces of Examples 1 to 3, expressed by the values obtained in the tensile impact test and the U-notch Izod impact test, are much improved over Comparative Examples 1 to 3.

It is also seen from the ratio of flexural modulus in the dry and wet states, the water absorption, and the dimensional changes due to water absorption that the change in various properties of the resin compositions of the invention due to water absorption is drastically reduced. In addition, the high heat distortion temperatures and the high level of organic solvent resistances which are characteristic of the resin compositions of Comparative Examples 1 to 3 are retained in the resin compositions of this invention.

EXAMPLES 4 TO 7 and

Comparative Examples 7 to 9

The same aromatic copolyester and Nylon 6 as used in Examples 1 to 3 and Surlyn 1855 (Zn ion type, a product of Mitsui Polychemical Co., Ltd.) as an ionomer were mixed in the proportions shown in Table 3. Test pieces were prepared by injection molding in the same way as in Examples 1 to 3.

Surlyn 1855 in Comparative Example 9 shown in Table 3 was in chip form, and therefore, was directly injection-molded.

The various properties of the test pieces were measured in the same way as in Examples 1 to 3. The results are shown in Table 4.

Table 3

| Example/ Comp.Ex. | Material 1 Polymer/mix | Amount (parts) | Material 2 Polymer | Amount (parts) |
|---|---|---|---|---|
| C.Ex. 7 | Nylon 6 | 66.7 | Surlyn 1855 | 33.3 |
| C.Ex. 8 | " | 50 | " | 55 |
| Ex. 4 | Chips of C.Ex. 2 | 66.7 | " | 33.3 |
| Ex. 5 | Chips of C.Ex. 8 | 66.7 | Aromatic copolyester | 33.3 |
| Ex. 6 | Chips of C.Ex. 2 | 50 | Surlyn 1855 | 50 |
| Ex. 7 | " | 30 | " | 70 |
| C.Ex. 9 | Surlyn 1855 | 100 | — | — |

Table 4

| Example (Ex.) or Comparative Example (C.Ex.) | Unit | Ex. 4 | Ex. 5 | Ex. 6 | Ex. 7 | C.Ex. 7 | C.Ex. 8 | C.Ex. 9 |
|---|---|---|---|---|---|---|---|---|
| Tensile Impact test (dry) | kg . cm/cm$^2$ | 270 | 220 | 325 | 650 | 420 | 530 | 408 |
| Flexural modulus (dry) | kg/cm$^2$ | 11500 | 6900 | 4950 | 1850 | 11700 | 4700 | 640 |
| Flexural modulus (wet) | " | 5300 | 4100 | 4700 | 1720 | 2500 | 1850 | 540 |
| Ratio of flexural modulus (dry) to flexural modulus (wet) | — | 2.17 | 1.68 | 1.05 | 1.08 | 4.68 | 2.54 | 1.19 |
| Heat distortion temperature (18.6 kg/cm$^2$)* | °C. | 66 | 57 | 58 | — | 55 | — | — |
| Heat distortion temperature (4.6 kg/cm$^2$) | °C. | 156 | 105 | 73 | 55 | 84 | 49 | 34.5 |
| Weight change in toluene | % | 3.9 | 29.3 | 6.1 | 35.2 | 0.4 | 23.1 | 48.5 |
| Dimensional change in toluene | % | 0.2 | 3.9 | 0.4 | 7.3 | 0.08 | 3.2 | 12.0 |

Table 4-continued

| Example (Ex.) or Comparative Example (C.Ex.) | Unit | Ex. 4 | Ex. 5 | Ex. 6 | Ex. 7 | C.Ex. 7 | C.Ex. 8 | C.Ex. 9 |
|---|---|---|---|---|---|---|---|---|
| Water absorption | % | 2.4 | 2.9 | 2.3 | 1.2 | 6.0 | 3.7 | 0.1 |
| Dimensional change by water absorption | % | 0.2 | 0.3 | 0.1 | Δ0.1 | 1.3 | 0.5 | Δ0.5 |

*In Examples 4 and 5 and Comparative Example 7, the heat distortion temperatures were measured after heat-treating the test pieces at 120° C. for 2 hours. In the balance of the examples, the measurement was made without prior heat-treatment.

When the test pieces of Examples 4 and 5 containing 33.3% by weight of the ionomer are compared with those of Comparative Example 7, it is seen that for test pieces of Examples 4 and 5, moisture has less effect on flexural modulus. Also these test pieces have higher heat distortion temperatures, lower water absorptions, and less changes due to water.

In spite of the fact that the proportion of the materials are almost the same for Examples 4 and 5, the resulting compositions show very different properties only because of a difference in the sequence of melt mixing. When the results of Examples 4 and 5 are compared with each other, it is clear that the procedure used in Example 5 is better in that the dependence of the dynamic properties on moisture is less, but the procedure of Example 4 is far better in impact properties, heat distortion temperature and solvent resistance.

It is understood from a comparison of Examples 6 and 7 with Comparative Examples 8 and 9 that even when the ionomer content is 50% by weight or more, the resin compositions of the invention show superior properties. The resin compositions with a high content of ionomer have very high impact strength and flexibility and their dynamic properties scarcely affected by moixture content. Furthermore, these compositions are far more stable thermally than the ionomer alone or a polyamide composition having about the same amount of the ionomer. To show the thermal stability more clearly, the shape retention and dimensional stability of the molded articles of Examples 6 and 7 and Comparative Examples 8 and 9 under heat were measured, and the results are shown in Table 5. The results substantiate the superiority of the resin compositions of this invention.

Shape Retention was measured by the following procedure. A rod-like test piece (5"×½"×⅛") is horizontally supported from one end to its center, and the other end is allowed to extend free. The test piece in this position is placed in an oven at the temperature and for the time shown in Table 5. After the treatment, the angle of deformation of the test piece is determined. When there is no deformation, the angle is 0. The unit is degrees.

To measure the Dimensional Change, the same test piece as used for Shape Retention is heated at the temperature and for the time shown in Table 5 on a Teflon sheet while allowing it to shrink freely. After the treatment, the shrinkage (%) of the test piece in the longitudinal direction is measured.

Table 5

| | Shape Retention and Dimensional Stability | | | | | |
|---|---|---|---|---|---|---|
| | Treating temp. (°C.) | Treating time (hrs.) | Example 6 | Example 7 | Comp. Ex. 8 | Comp. Ex. 9 |
| Shape retention | 80 | 1 | 0 | 0 | 2 | 22 |
| | 100 | 1 | 0 | 3 | 3 | 80 |
| | 120 | 1 | 0 | 50 | 8 | — |

Table 5-continued

| | Shape Retention and Dimensional Stability | | | | | |
|---|---|---|---|---|---|---|
| | Treating temp. (°C.) | Treating time (hrs.) | Example 6 | Example 7 | Comp. Ex. 8 | Comp. Ex. 9 |
| (*) | 150 | 1 | 1 | — | 15 | — |
| Dimensional change | 80 | 1 | 0 | 0.1 | 0.1 | 1.4 |
| | 100 | 1 | 0.1 | 0.2 | 0.4 | 30 |
| | 120 | 1 | 0.1 | 0.4 | 0.8 | — |
| | 150 | 1 | 0.1 | — | 1.6 | — |

EXAMPLES 8 TO 10 and

Comparative Example 10

The same aromatic copolyester as used in Example 1, polyhexamethylene adipamide (having a relative viscosity, measured at 25° C. in 96% sulfuric acid at a polymer concentration of 1%, of 2.8) and Surlyn 1855 were mixed in the proportions shown in Table 6. Test pieces were prepared from these mixtures by injection molding as in Examples 1 to 3. The gate non-breaking ratios and heat distortion temperatures of these test pieces were measured, and the results are shown in Table 6. The gate non-breaking ratio of a thin portion, as a measure for flexural strength, increased markedly as a result of adding as small as 1% by weight of the ionomer without any adverse effect on the heat distortion temperature (measured in accordance with ASTM D-648). Prior to the measurement of heat distortion temperature at 18.6 kg/cm², the test piece was annealed at 150° C. for 2 hours.

Table 6

| Example/ Comp. Example | PPES (parts) | PA (parts) | Surlyn 1855 (parts) | Gate non-breaking ratio (%) | Heat distortion temperature (°C.) |
|---|---|---|---|---|---|
| C.Ex. 10 | 50 | 50 | 0 | 0 | 156 |
| Ex. 8 | 49.5 | 49.5 | 1 | 60 | 155 |
| Ex. 9 | 49 | 49 | 2 | 100 | 155 |
| Ex. 10 | 48 | 48 | 4 | 100 | 157 |

EXAMPLES 11 TO 14 and

Comparative Examples 11 to 14

Twenty-five parts by weight of the resin composition of Comparative Example 2 was mixed with 25 parts by weight of each of the ionomers indicated in Example 7. The mixture was dried, and melt-extruded. Test pieces for the tensile impact test and rod-like test pieces were prepared from the resulting resin compositions, and the tensile impact values and dimensional changes with temperature of these test pieces were measured as in Examples 4 to 7. The results are shown in Table 7.

Table 7

| Example/ Comp. Ex. | Composition of resin | | | | | Tensile impact strength (kg · cm/cm²) | Dimensional changes (%) | |
|---|---|---|---|---|---|---|---|---|
| | PPES (parts) | Nylon 6 (parts) | Ionomer Type (*) | Metal ion (*) | Amount (parts) | | 80° C. 1 hr. | 100° C. 1 hr. |
| Ex. 11 | 12.5 | 12.5 | Surlyn 1706 | Zn | 75 | 373 | 0 | 0 |
| Ex. 12 | " | " | Surlyn 1855 | Zn | " | 685 | 0 | 0 |
| Ex. 13 | " | " | Surlyn 1555 | Na | " | 180 | 0 | 0 |
| Ex. 14 | " | " | Surlyn 1601 | Na | " | 275 | 0 | 0 |
| C.Ex. 11 | 0 | 0 | Surlyn 1706 | Zn | 100 | 164 | 8 | 20 |
| C.Ex. 12 | " | " | Surlyn 1855 | Zn | " | 408 | 8 | 30 |
| C.Ex. 13 | " | " | Surlyn 1555 | Na | " | 270 | 0 | 1 |
| C.Ex. 14 | " | " | Surlyn 1601 | Na | " | 320 | 1 | 1 |

*In accordance with the catalog of Mitsui Polychemical Co., Ltd.

It is seen from Table 7 that when the metallic ion of the ionomer is Zn, the resin compositions of this invention have surprisingly increased tensile impact strengths over the comparative resin compositions. The ionomers containing a Zn ion were thermally unstable, but the resin composition of Examples 11 and 12 exhibited the same thermal stability as the resin compositions of Examples 13 and 14.

EXAMPLE 15 and

Comparative Example 15

One hundred parts by weight of the chips of Comparative Example 2 was mixed with 35 parts by weight of TiO₂, and the mixture was extruded at a cylinder temperature of 260° C. to form chips (Comparative Example 15).

Separately, 85 parts by weight of the chips of Comparative Example 2, 15 parts by weight of Surlyn 1650 (Zn ion type, a product of Mitsui Polychemical Co., Ltd.) as an ionomer, and 35 parts by weight of TiO₂ were extruded under the same conditions as above to form chips (Example 15). These chips were injection-molded, and tested, in the same way as in Example 1. The results are shown in Table 8.

As is clearly seen from Table 8, even when a large quantity of filler is added, the resin composition of this invention retained relatively good impact properties.

Table 8

| Test | Unit | Ex. 15 | Comp. Ex. 15 |
|---|---|---|---|
| Dimensional change after treatment at 150° C. for 1 hr. | % | 0.14 | 0.13 |
| Tensile impact strength | kg · cm/cm² | 150 | 43 |
| Flexural stress (*1) | kg | 5.7 | 7.0 |
| Amount of flex at flexural modulus (*1) | mm | >45 | 22.5 |

(*1) A sample of a size of 5 × ½ × ¼ inch was used for this test. Flexural stress was applied to the center of the sample supported by two fulcra being set at 10 cm, and the amount of flex until the sample broken was measured. When the amount of flex exceed 45 mm, the sample was no longer suspended between the fulcra.

EXAMPLE 16 and

Comparative Example 16

Thirty parts by weight of the same aromatic copolyester as used in Example 1 to 3, 50 parts by weight of Nylon 6, and 20 parts by weight of polyethylene terephthalate (having a logarithmic viscosity, measured at 25° C. in a 6:4 by weight mixture of phenol and tetrachloroethane, of 0.62) were mixed, dried and made into chips (Comparative Example 16).

Twenty parts by weight of Surlyn 1650 (Zn ion type, a product of Mitsui Polychemical Co., Ltd.) as an ionomer was added to the chips obtained in Comparative Example 16. The mixture was extruded into chips (Example 16).

Test pieces were prepared from these chips, and tested as shown in Table 9. The results are shown in Table 9.

As shown in Table 9, the resin composition of this invention has improved impact properties also when containing polyethylene terephthalate. Its dimensional stability in water also increased.

Table 9

| Test | Unit | Ex. 16 | Comp. Ex. 16 |
|---|---|---|---|
| Tensile impact strength | kg · cm/cm² | 230 | 160 |
| Water absorption (after treatment at 80° C. for 48 hrs) | % | 1.9 | 2.3 |
| Dimensional change due to water absorption | % | 0.51 | 0.85 |

EXAMPLES 17 TO 19

Monofilaments (having a diameter of about 3 mm) were prepared by the same procedure as the chip formation in Example 4 except that the product was not subjected to a chip cutter (Example 17).

In the same way, monofilaments (diameter about 3 mm) were prepared in the production of chips in Example 5 (Example 18).

Monofilaments having a diameter of about 3 mm and about the same composition ratio as in Examples 4 and 5 were obtained by extruding an aromatic copolyester, a polyamide and an ionomer in one step (Example 19).

These monofilaments were cut to a length of 10 cm, and then heat-treated in an oven at 170° C. for a predetermined period of time. Then, to determine the state of embrittlement, they were bent by hand three times. The results are shown in Table 10.

Table 10

| Example | 17 | 18 | 19 |
|---|---|---|---|
| Number of bendings after heat treatment at 170° C. for 24 hours[1] | 10< | 10< | 2, 3 |
| Number of bendings after heat treatment at 170° C. for 48 hours[1] | 10< | 10< | 1 |
| Number of bendings after heat treatment at 170° C. for 72 hours[1] | 10< | 4, 6, 10< | 1 |

[1]average of 3 runs.

It is seen from Table 10 that the resin composition of Example 17 which was obtained by melt-extruding the aromatic copolyester and polyamide, then adding the ionomer, and melt-extruding the mixture, or the resin composition of Example 18 which was obtained by melt-extruding the polyamide and the ionomer, then adding the aromatic copolyester, and melt-extruding the mixture exhibited far better thermal stability than the resin composition of Example 19 which was obtained by melt-extruding the three ingredients in one step.

While the invention has been described in detail and with reference to specific embodiments thereof, it will be apparent to one skilled in the art that various changes and modifications can be made therein without departing from the spirit and scope thereof.

What is claimed is:
1. A resin composition comprising
   (A) about 5 to about 94.9% by weight of an aromatic copolyester comprising the reaction product in about equimolar amounts of
       (1) a mixture of terephthalic acid and isophthalic acid and/or the functional derivatives thereof with the terephthalic acid unit to the isophthalic acid unit molar ratio being about 9:1 to about 1:9 and
       (2) a bisphenol of the general formula [I]

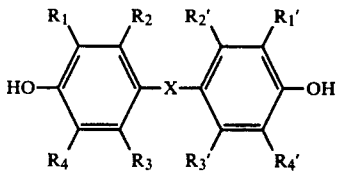

wherein —X— represents a member selected from the group consisting of —O—, —S—, —SO₂—, —SO—, —CO—, an alkylene group containing 1 to 5 carbon atoms and an alkylidene group containing 1 to 5 carbon atoms, and R₁, R₂, R₃, R₄, R₁', R₂', R₃' and R₄', which may be the same or different, each is selected from the group consisting of a hydrogen atom, a chlorine atom, a bromine atom and an alkyl group containing 1 to 5 carbon atoms, and/or a derivative thereof;
   (B) about 5 to about 94.9% by weight of a polyamide containing therein a repeating unit of the following general formula [II]:

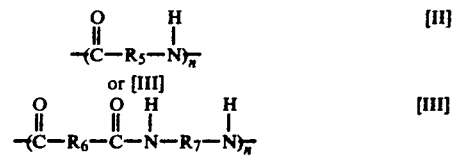

wherein R₅, R₆ and R₇, which may be the same or different, each represents an alkylene group containing 4 to 11 carbon atoms and n is an integer from 30 to 500, and
   (C) about 0.1 to about 90% by weight of an ionomer.
2. The composition of claim 1, wherein the bisphenol is 2,2-bis(4'-hydroxyphenyl)propane.
3. The composition of claim 1, wherein the polyamide is polycaprolactam.
4. The composition of claim 1, wherein the polyamide is polyhexamethylene adipamide.
5. The composition of claim 1, wherein the ionomer is an ionomer containing a zinc ion.
6. The composition of claim 1, wherein the weight ratio of component (A) to that of component (B) is from 25:75 to 75:25, and component (C) is present in an amount of 2 to 25% by weight.
7. The composition of claim 1, wherein the weight ratio of the content of component (A) to that of component (B) is from 25:75 to 75:25, and component (C) is present in an amount of more than 25% but less than 50% by weight.
8. The composition of claim 1, wherein the weight ratio of the content of component (A) to that of component (B) is from 25:75 to 75:25, and component (C) is present in an amount of more than 50% but less than 80% by weight.
9. The resin composition of claim 1, wherein the ionomer contains a metal ion selected from the group consisting of Na⁺, K⁺, Li⁺, Cu²⁺, Be²⁺, Mg²⁺, Zn²⁺, and Al³⁺.
10. The resin composition of claim 9, wherein said ionomer metal ion is Cu²⁺ or Zn²⁺.
11. The resin composition of claim 1, wherein the base copolymer of said ionomer is a copolymer of an α-olefin of the general formula RCH=CH₂, wherein R represents a hydrogen atom, a formyloxy group, an acetoxy group, a benzoyloxy group, a hydroxy group, a halogen atom, an alkyl group containing 1 to 8 carbon atoms, an aryl group containing 6 to 12 carbon atoms or an alicyclic group containing 6 to 12 carbon atoms; and an α,β-unsaturated carboxylic acid.
12. The resin composition of claim 11, wherein said base copolymer is ethylene-acrylic acid copolymer or ethylene-methacrylic acid copolymer.
13. The resin composition of claim 1, wherein component (A) is present in an amount of at least 25% by weight.
14. The resin composition of claim 13, wherein component (B) is present in an amount of at least 25% by weight.
15. The resin composition of claim 1, wherein said composition contains a filler.
16. The resin composition of claim 1, wherein said composition contains 0.01 to 5% by weight of a heat decomposition inhibitor.
17. The resin composition of claim 16, wherein said inhibitor is a combination of an amine compound and cuprous chloride.

18. The resin composition of claim 1, wherein said composition is prepared by a method which comprises melt-mixing said aromatic copolyester (A) and said polyamide (B) first to form a resin composition, and mixing the composition with an ionomer in the molten state, or a method which comprises melt-mixing the ionomer and said polyamide (B) to form a resin composition, and then mixing the composition with said aromatic copolyester (A) in the molten state.

19. The resin composition of claim 1, wherein said bisphenol is selected from the group consisting of 4,4'-dihydroxy-diphenyl ether, bis(4-hydroxy-2-methylphenyl)ether, bis(4-hydroxy-3-chlorophenyl)ether, bis(4-hydroxyphenyl)sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenyl)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and 1,1-bis(4-hydroxyphenyl)-n-butane.

20. The resin composition of claim 1, wherein said polyamide is selected from the group consisting of polyhexamethylene adipamide, polycaprolactam, polyhexamethylene sebacamide, polyaminoundecanoic acid, and polylaurolactam.

* * * * *